United States Patent
Lane

(10) Patent No.: US 10,116,863 B2
(45) Date of Patent: Oct. 30, 2018

(54) SCANNING WITH FRAME AVERAGING

(71) Applicant: Goodrich Corporation, Charlotte, NC (US)

(72) Inventor: Richard N. Lane, Westford, MA (US)

(73) Assignee: Goodrich Corporation, Charlotte, NC (US)

( * ) Notice: Subject to any disclaimer, the term of this patent is extended or adjusted under 35 U.S.C. 154(b) by 168 days.

(21) Appl. No.: 15/181,693

(22) Filed: Jun. 14, 2016

(65) Prior Publication Data

US 2017/0359510 A1 Dec. 14, 2017

(51) Int. Cl.
| | |
|---|---|
| *G06K 9/00* | (2006.01) |
| *H04N 5/232* | (2006.01) |
| *G06T 5/00* | (2006.01) |
| *H04N 5/225* | (2006.01) |
| *G01C 11/02* | (2006.01) |
| *G06T 5/50* | (2006.01) |

(52) U.S. Cl.
CPC ....... *H04N 5/23232* (2013.01); *G01C 11/025* (2013.01); *G06T 5/006* (2013.01); *G06T 5/50* (2013.01); *H04N 5/2253* (2013.01); *H04N 5/23296* (2013.01); *G06T 2207/10032* (2013.01); *G06T 2207/20216* (2013.01); *H05K 999/99* (2013.01)

(58) Field of Classification Search
CPC ............. H04N 5/2253; H04N 5/23232; H04N 5/23296; G06T 2207/10032; G06T 2207/20216; G06T 5/006; G06T 5/50; G01C 11/025

See application file for complete search history.

(56) References Cited

U.S. PATENT DOCUMENTS

| | | | |
|---|---|---|---|
| 6,784,922 B1* | 8/2004 | Fossel | G01C 11/025 348/144 |
| 7,760,965 B2 | 7/2010 | Tener et al. | |
| 8,953,012 B2 | 2/2015 | Williams et al. | |
| 9,063,391 B2 | 6/2015 | Yavin | |
| 2010/0305782 A1* | 12/2010 | Linden | G01C 11/025 701/3 |
| 2016/0171657 A1* | 6/2016 | Matson | G06T 5/003 382/299 |

FOREIGN PATENT DOCUMENTS

DE 19822249 A1 11/1999

OTHER PUBLICATIONS

Extended European Search Report dated Mar. 16, 2018 issued during the prosecution of European Patent Application No. 17175910.3 (11 pages).

* cited by examiner

*Primary Examiner* — Amara Abdi
(74) *Attorney, Agent, or Firm* — Locke Lord LLP; Scott D. Wofsy; Joshua L. Jones

(57) ABSTRACT

A method of obtaining image data includes scanning an imaging area with an imaging device while obtaining multiple overlapping images of the imaging area. The method also includes transforming the overlapping images by performing frame averaging on the overlapping images to produce at least one enhanced image of the imaging area.

13 Claims, 4 Drawing Sheets

SCANNING WITH FRAME AVERAGING

BACKGROUND OF THE INVENTION

1. Field of the Invention

The present disclosure relates to imaging, and more particularly to imaging such as used in obtaining long range oblique images of the ground from aircraft or spacecraft.

2. Description of Related Art

Traditional long range oblique imaging has limitations imposed by the effects of atmosphere including low transmission which reduces the signal to noise ratio, and atmospheric turbulence which causes a wavefront error which in turn softens the image. Atmospheric transmission increases at longer wavelengths and the effects of atmospheric turbulence go down as wavelength increases; however, a longer wavelength requires a bigger aperture to achieve the same limiting spatial resolution. The atmospheric effects can be mitigated by using longer exposure times; however the longer the exposure time, the better must be the stabilization.

Such conventional methods and systems have generally been considered satisfactory for their intended purpose. However, there is still a need in the art for improved imaging. The present disclosure provides a solution for this need.

SUMMARY OF THE INVENTION

A method of obtaining image data includes scanning an imaging area with an imaging device while obtaining multiple overlapping images of the imaging area. The method also includes transforming the overlapping images by performing frame averaging on the overlapping images to produce at least one enhanced image of the imaging area.

Scanning an imaging area can include at least one of rotating the imaging device around a gimbal axis while obtaining the overlapping images or rotating a mirror that is optically coupled to the imaging device. Obtaining the overlapping images can include obtaining the overlapping images at a frame rate high enough to provide multiple overlapping images of a given area in the imaging area, e.g., a frame rate high enough to provide two or more overlapping images of a given area in the image area.

Transforming the overlapping images by performing frame averaging can be performed automatically at a coarse level to produce the at least one enhanced image of the overall area. The method can include transforming the overlapping images by performing super resolution frame averaging on at least one portion of the at overlapping images to produce at least one super resolution image of the imaging area wherein the at least one super resolution image has a finer sampling than the at least one enhanced image. Automatic object detection can be used to select the at least one portion of the overlapping images for producing the at least one super resolution image of a detected object. Using automatic object detection can include detecting moving objects within the overlapping images for producing the at least one super resolution image of moving objects detected.

Transforming the overlapping images can include identifying a region of interest, gathering images from the overlapping images that include the region of interest, performing compensation on the gathered images for optical distortion, compensating for orientation differences among the gathered images, selecting a master image, and registering the gathered images to the master image, wherein frame averaging is performed on the gathered images after they have been registered. Compensating for orientation differences can include using motion data and a motion model and/or sensor model. Selecting a master image can include at least one of choosing a master image from among the gathered images or selecting a virtual master image to use as the master image for registration.

A system for obtaining image data includes an imaging sensor optically coupled to optics for forming an image on the imaging sensor. The imaging sensor is mounted to a platform configured for scanning the imaging sensor over an imaging area while obtaining overlapping images of the imaging area. A module is operatively connected to the imaging sensor to receive and the overlapping images from the imaging sensor and to transform the overlapping images by performing frame averaging on the overlapping images to produce at least one enhanced image of the imaging area. The platform can include a gimbal configured to rotate the imaging sensor while obtaining the overlapping images. It is also contemplated that the platform can include a stabilization mirror optically coupled to the imaging device, wherein the stabilization mirror is configured to counteract movement of the gimbal during each exposure while obtaining the overlapping images. The module can include machine readable instructions configured to perform any of the image transformation methods described herein.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
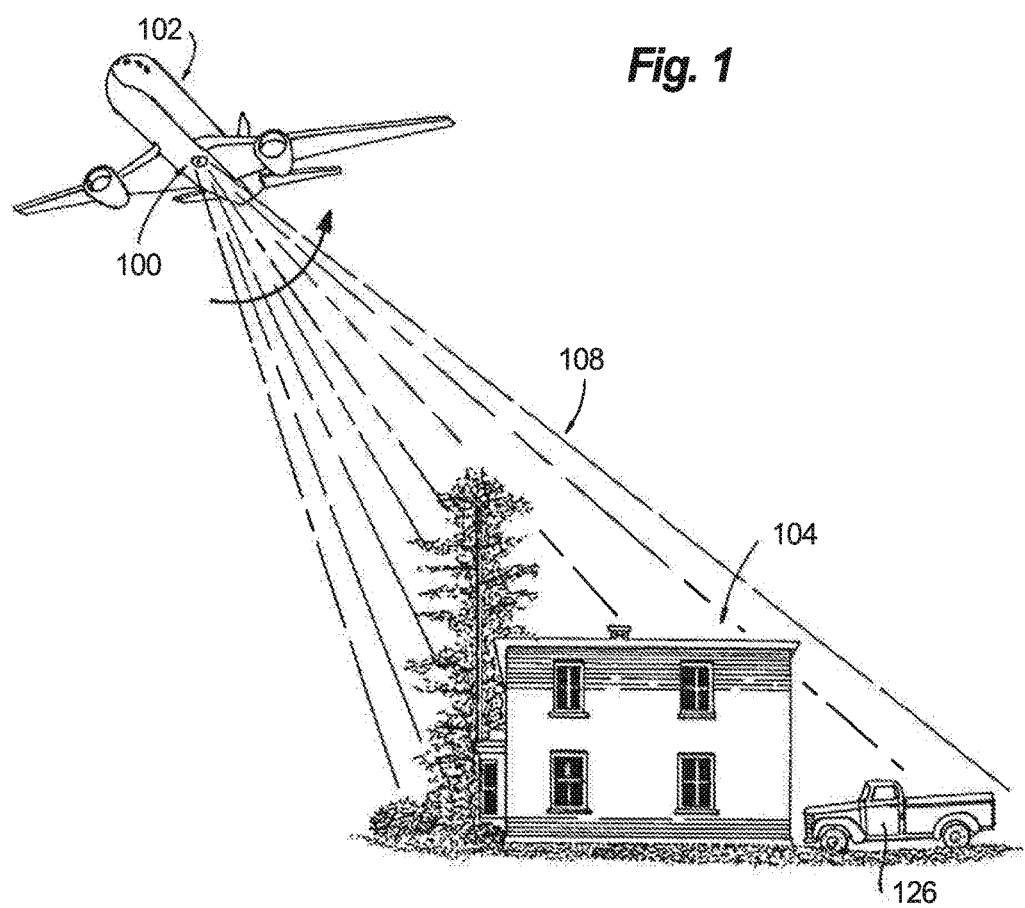
FIG. 1 is a schematic view of an exemplary embodiment of a system and method in accordance with the present disclosure, showing an aircraft with an imaging system scanning and obtaining multiple overlapping images of an imaging area on the ground.

Reference will now be made to the drawings wherein like reference numerals identify similar structural features or aspects of the subject disclosure. For purposes of explanation and illustration, and not limitation, a partial view of an exemplary embodiment of a system, and associated method, in accordance with the disclosure is shown in FIG. 1 and is designated generally by reference character 100. Other embodiments of systems and methods in accordance with the disclosure, or aspects thereof, are provided in FIGS. 2-3, as will be described. The systems and methods described herein can be used to improve imaging, such as long range oblique imaging for aircraft and spacecraft imaging the ground.

System 100 is mounted to an aircraft 102. A method of obtaining image data using system 100 includes scanning an imaging area 104 with an imaging device 106 of system 100, shown in FIG. 2, while obtaining multiple overlapping images of the imaging area 104. The scanning motion of imaging device 106 is indicated schematically in FIG. 1 with the large curved arrow crossing scan lines 108. Scan lines 108 schematically represent lines of sight to images obtained of area 104.

Figure 2:
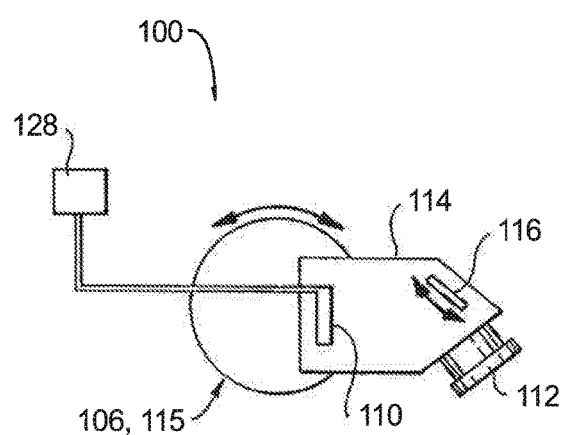
FIG. 2 is a schematic view of the imaging system of FIG. 1, showing the gimbal and stabilization mirror.

With reference now to FIG. 2 system 100 for obtaining image data includes an imaging device 106, which includes imaging sensor 110 optically coupled to optics 112 for forming an image on the imaging sensor 110. Imaging sensor 110 can be a focal plane array, e.g. a two-dimensional array, or any other suitable type of imaging sensor. The imaging sensor 110 is mounted to a platform 114 configured for scanning the imaging sensor 110 over an imaging area while obtaining overlapping images of the imaging area. The platform 114 includes a gimbal 115 configured to rotate the imaging sensor 110 while obtaining the overlapping images. Scanning an imaging area includes rotating the imaging device 106 around a gimbal axis of gimbal 115, as indicated by the large double arrows in FIG. 2, while obtaining the overlapping images. This can optimally include rotating a back scan or stabilization mirror 116 mounted to the platform 114 that is optically coupled to the imaging device 110. Rotation of the stabilization mirror is indicated in FIG. 2 by the small double arrows. The stabilization mirror 116 is configured to rotate to counteract movement of the gimbal during each exposure while obtaining the overlapping images. Obtaining the overlapping images can include obtaining the overlapping images at a frame rate high enough to provide multiple overlapping images of a given area in the imaging area, e.g., a frame rate high enough to provide two or more overlapping images of a given area in the image area.

Figure 3:
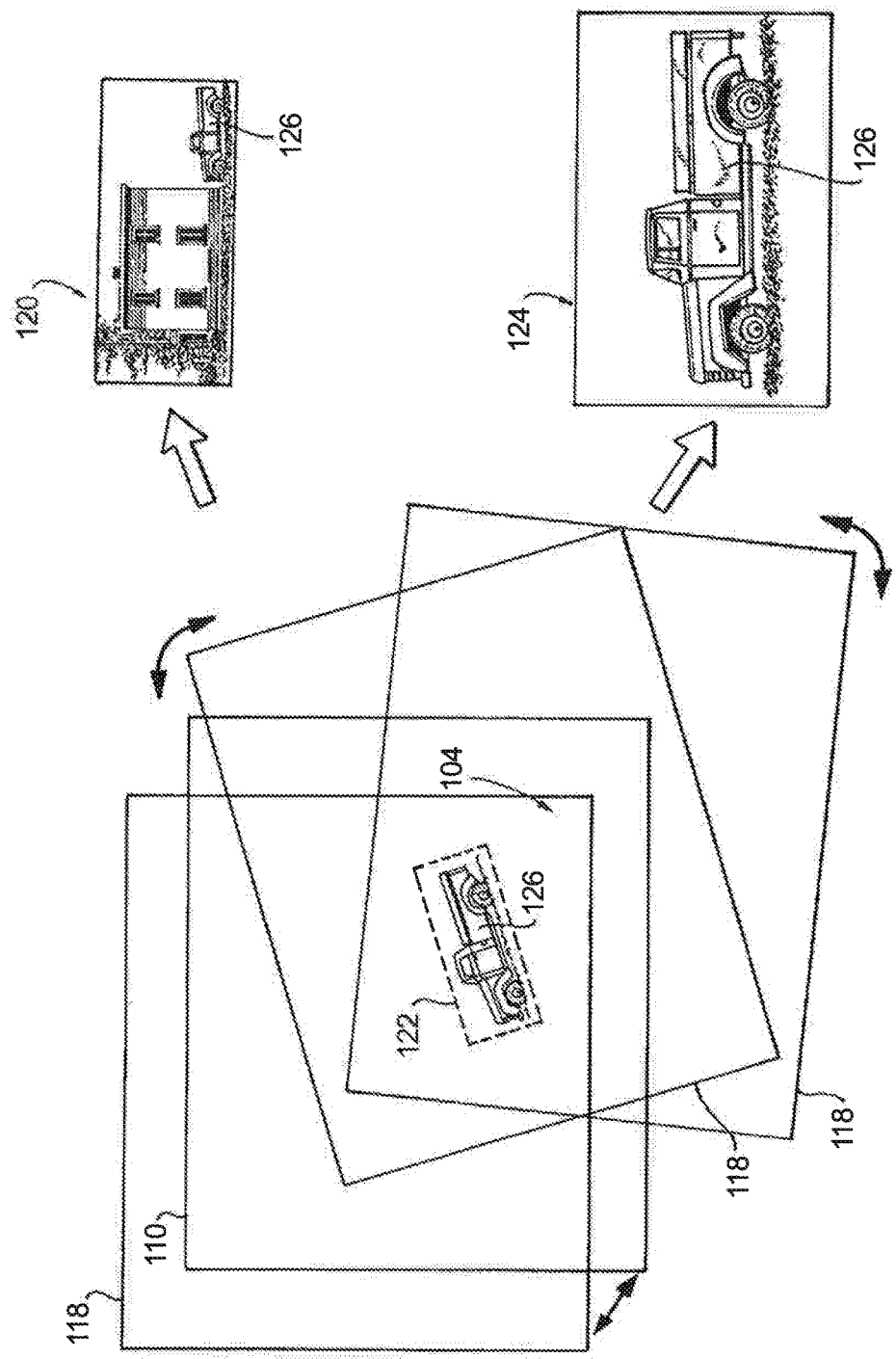
FIG. 3 is a schematic view of a set of overlapping images transformed using an exemplary embodiment of a method in accordance with the present disclosure, showing registration of the overlapping images to allow frame averaging of an area of interest, and showing frame averaging in the area of interest to obtain a super resolution image of the area of interest.

With reference now to FIG. 3, the method also includes transforming the overlapping images 118 by performing frame averaging on the overlapping images 118 to produce an enhanced image 120 of the imaging area. Transforming the overlapping images 118 by performing frame averaging can be performed automatically at a coarse level to produce the enhanced image 120. The coarse level frame averaging can include determining what pixels from each overlapping image or frame overlap at a sub-pixel sampling distance, and averaging the overlapping pixels. This averaging increases the signal to noise ratio while at the same time the sensor continues to scan a larger area to maintain large area coverage while not increasing requirements on stabilization relative to traditional systems.

Figure 4:
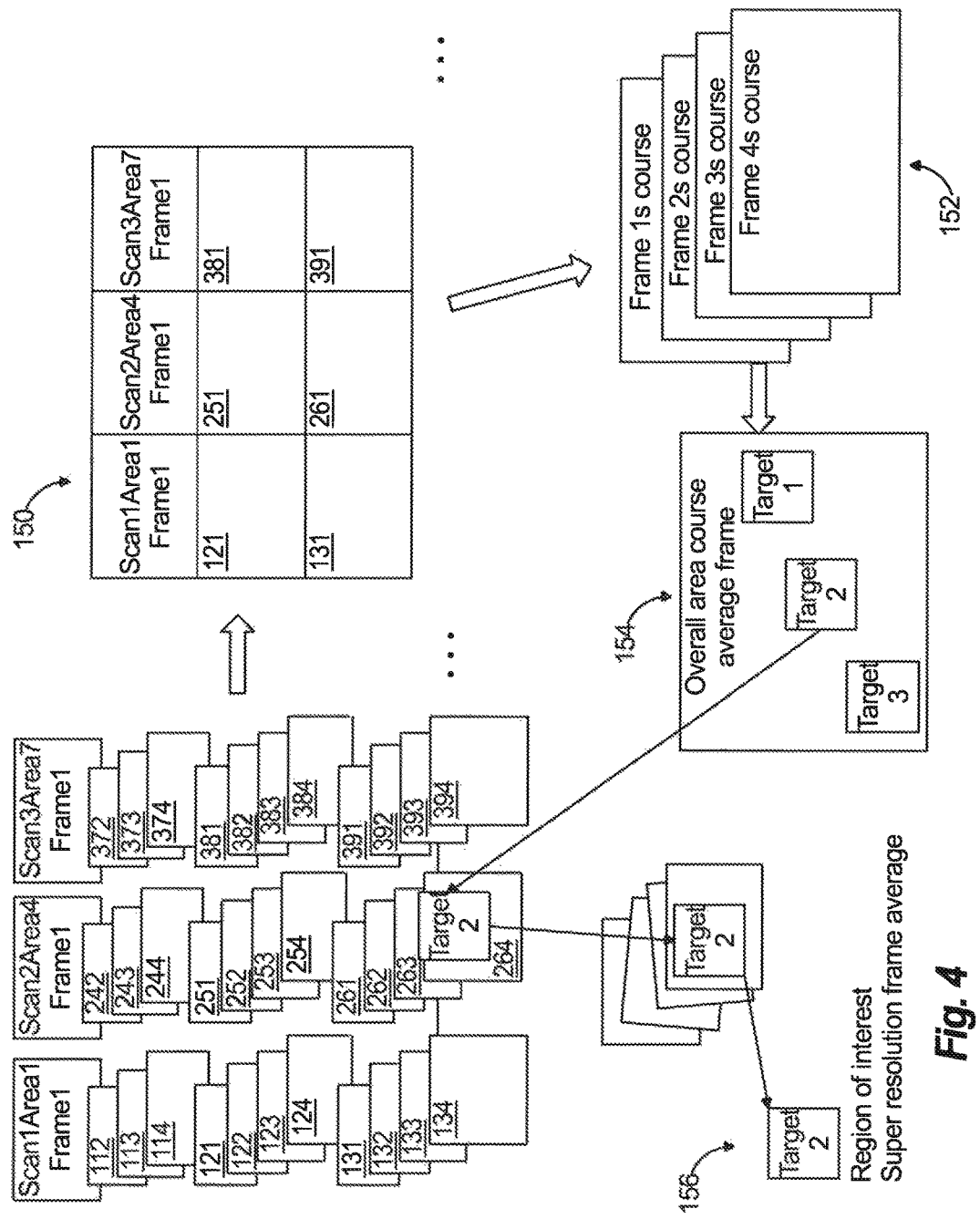
FIG. 4 is a schematic view of the method of FIG. 3, showing additional details.

FIG. 4 is a more detailed illustration of the relationship of frames within a scan and several scans. FIG. 4 shows how the frames from each scan overlap for three scans, wherein the ellipsis indicates any suitable number of scans can be used. This is an example where four frames overlap each ground point, e.g., frames 112, 113, 114, and the frame labeled Scan1Area1Frame1 all overlap a ground point; frames 121, 122, 123, and 124 all overlap another ground point and so forth. Then all of the first frames are pieced together at a course level, as indicated by the block 150 in FIG. 4. The same is done for all of the second frames, third frames, fourth frames, and additional frames if any as indicated by the ellipsis on the right in FIG. 4. Then these combined, course level images 152 are combined at a course level to form one average frame 154 of the entire area. This will have higher signal to noise ratio than any individual frame. Then the region of interest can be selected to further enhance with super resolution and frame averaging as indicated by reference character 156.

With reference again to FIG. 3, the method can include transforming the overlapping images 118 by performing super resolution frame averaging on at least one portion 122 of the at overlapping images 118 to produce at least one super resolution image 124 of the imaging area wherein the at least one super resolution image 124 has a finer sampling than the at least one enhanced image 120. In other words, frame averaging to obtain super resolution image 124 includes increasing the sampling resolution or pixel count for area 122 to enhance detail or the like.

Automatic object detection can be used to select the at least one portion 122 of the overlapping images 118 for producing the super resolution image 124 of a detected object 126. Using automatic object detection can include detecting moving objects within the overlapping images between scans for producing the super resolution image 124 of moving objects detected. Those skilled in the art will readily appreciate that in addition to or in lieu of automatic object detection, user object detection can be used without departing from the scope of this disclosure.

Figure 5:
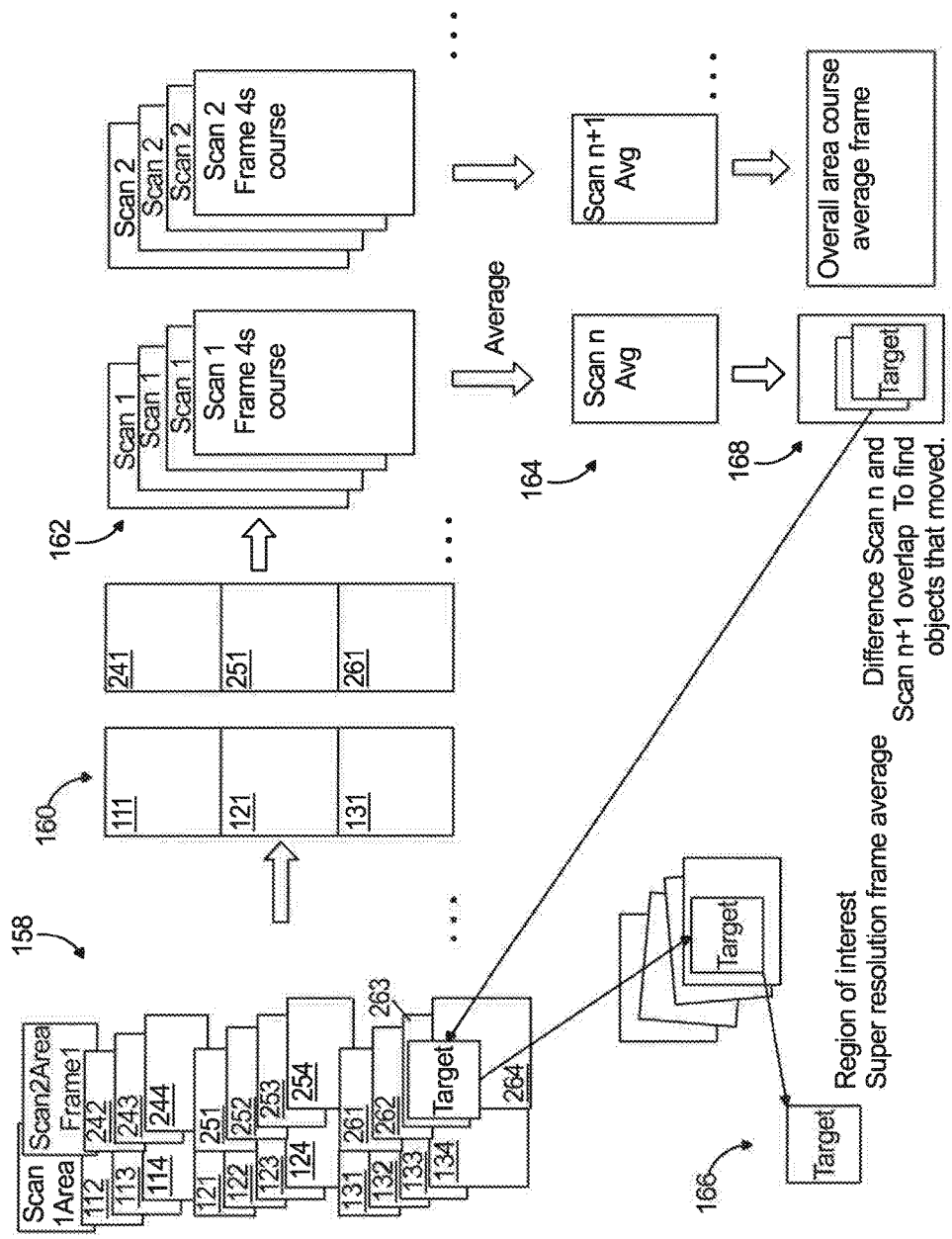
FIG. 5 is a schematic view of an exemplary embodiment of a method of moving object detection and image enhancement in accordance with the present disclosure, showing detection of a moving object by differencing two average frames from different scans.

With reference now to FIG. 5, the moving object detection is shown schematically in greater detail. The time separation between frames within a scan maybe adequate as described above. However it may also be beneficial to overlap the scans, as indicated by reference character 158 in FIG. 5, and use this larger time separation, i.e., the time separation from one scan to the next rather than from image to image within a single scan, to provide the moving target detection. Similar to the process described above with respect to FIG. 4, the frames of each scan are pieced together at a course level as indicated by reference character 160. The combined course level images 162 are produced similar to those described with respect to FIG. 4 above. Combining these creates average frames 164. Since the object is moving, the registration includes additional steps beyond those shown in FIG. 4. Initially one can register the background in order to detect what moved then one can register just what moved and ignore the background, e.g., by differencing the overlap area between average frames 164, as indicated by reference character 168. The frame averaging and super resolution enhancement 166 can then be performed using all the frames of just the moving target.

Transforming the overlapping images 118 can include identifying the region of interest, e.g., portion 122, gathering images from the overlapping images 118 that include the region of interest, performing compensation on the gathered images for optical distortion, compensating for orientation differences among the gathered images, selecting a master image, and registering the gathered images to the master image, wherein frame averaging is performed on the gathered images after they have been registered. This compensation and registration of images are indicated schematically in FIG. 3 by the double arrows indicating translations and rotation of images 118, and can also include warps or other transformations. Compensating for orientation differences can include using motion data and a motion model and/or a sensor model, e.g. from sensors on board aircraft 102 of FIG. 1. A motion model can be useful, e.g., for estimating small movements like between the frames within a scan and can be adequate between scans as well. A sensor model could be used to project the pixel to the ground and ground back to the pixel in the other frames. This could be used when the time separation is more significant or the data is from another collection. Selecting a master image can include at least one of choosing a master image from among the gathered images or selecting a virtual master image to use as the master image for registration.

With reference again to FIG. 2, a module 128 is operatively connected to the imaging sensor 110 to receive and the overlapping images 118 from the imaging sensor 110 and to transform the overlapping images 118 by performing frame averaging on the overlapping images 118 to produce at least one enhanced image of the imaging area as described above. The module 128 can include machine readable instructions configured to perform any of the image transformation methods described herein.

In accordance with embodiments in this disclosure, frame averaging can be done while scanning, which provides increased coverage of a larger area and can simultaneously have a separate channel with a line array, for example, collecting imagery of the same area in one or more additional spectral bands. A beam splitter can be used to provide the separate channel for simultaneous collection of imagery from a second focal plane. The improved signal to noise ratio relative to traditional systems allows for image sharpening that may not have been possible with a single frame. The sub pixel samples that can be attained as described above can provide additional detail relative to traditional systems.

As will be appreciated by those skilled in the art, aspects of the present embodiments may be embodied as a system, method or computer program product. Accordingly, aspects of the present embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in a flowchart and/or block diagram block or blocks.

The methods and systems of the present disclosure, as described above and shown in the drawings, provide for imaging with superior properties including improved performance for systems doing long range oblique imaging. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of obtaining image data comprising:
    scanning an imaging area with an imaging device while obtaining multiple overlapping images of the imaging area; and
    transforming the overlapping images by performing frame averaging on the overlapping images to produce at least one enhanced image of the imaging area, wherein transforming the overlapping images by performing frame averaging is performed automatically at a coarse level to produce the at least one enhanced image, and further comprising:
    transforming the overlapping images by performing super resolution frame averaging on at least one portion of the at overlapping images to produce at least one super resolution image of the imaging area wherein the at least one super resolution image has a finer sampling than the at least one enhanced image.

2. A method as recited in claim 1, wherein scanning an imaging area includes at least one of rotating the imaging device around a gimbal axis while obtaining the overlapping images or rotating a mirror that is optically coupled to the imaging device.

3. A method as recited in claim 1, wherein obtaining the overlapping images includes obtaining the overlapping images at a frame rate high enough to provide two or more overlapping images of a given area in the imaging area.

4. A method as recited in claim 3, wherein obtaining the overlapping images includes obtaining the overlapping images at a frame rate high enough to provide three or more overlapping images of a given area in the image area.

5. A method as recited in claim 1, further comprising: using automatic object detection to select the at least one portion of the overlapping images for producing the at least one super resolution image of a detected object.

6. A method as recited in claim 5, wherein using automatic object detection includes detecting moving objects within the overlapping images for producing the at least one super resolution image of moving objects detected.

7. A method as recited in claim 1, wherein transforming the overlapping images includes identifying a region of interest, gathering images from the overlapping images that include the region of interest, performing compensation on the gathered images for optical distortion, compensating for orientation differences among the gathered images, selecting a master image, and registering the gathered images to the master image, wherein frame averaging is performed on the gathered images after they have been registered.

8. A method as recited in claim 7, wherein compensating for orientation differences includes using motion data and a motion model and/or sensor model.

9. A method as recite in claim 7, wherein selecting a master image includes at least one of choosing a master image from among the gathered images or selecting a virtual master image to use as the master image for registration.

10. A system for obtaining image data comprising:
    an imaging sensor optically coupled to optics for forming an image on the imaging sensor;
    the imaging sensor being mounted to a platform configured for scanning the imaging sensor over an imaging area while obtaining overlapping images of the imaging area; and
    a module operatively connected to the imaging sensor to receive the overlapping images and to transform the overlapping images by performing frame averaging on the overlapping images to produce at least one enhanced image of the imaging area, wherein the module includes machine readable instructions configured to:
    transform the overlapping images by performing frame averaging automatically at a coarse level to produce the at least one enhanced image; and
    transform the overlapping images by performing super resolution frame averaging on at least one portion of the at overlapping images to produce at least one super resolution image of the imaging area wherein the at least one super resolution image has a finer sampling than the at least one enhanced image.

11. A system as recited in claim 10, wherein the platform includes a gimbal configured to rotate the imaging sensor while obtaining the overlapping images.

12. A system as recited in claim 11, wherein the platform includes a stabilization mirror optically coupled to the imaging device, wherein the stabilization mirror is configured to counteract movement of the gimbal during each exposure while obtaining the overlapping images.

13. A system as recited in claim 10, wherein the module includes machine readable instructions configured to use automatic object detection to select the at least one portion of the overlapping images for producing the at least one super resolution image of a detected object.

* * * * *